(12) United States Patent
Hayashi

(10) Patent No.: US 10,144,326 B2
(45) Date of Patent: Dec. 4, 2018

(54) VEHICLE SEAT

(71) Applicant: TOYOTA BOSHOKU KABUSHIKI KAISHA, Aichi-ken (JP)

(72) Inventor: Koji Hayashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/162,928

(22) Filed: May 24, 2016

(65) Prior Publication Data

US 2016/0347225 A1 Dec. 1, 2016

(30) Foreign Application Priority Data

May 26, 2015 (JP) .................................. 2015-106633

(51) Int. Cl.
*B60N 2/68* (2006.01)

(52) U.S. Cl.
CPC .................................... *B60N 2/688* (2013.01)

(58) Field of Classification Search
CPC ....................................................... B60N 2/688
See application file for complete search history.

(56) References Cited

U.S. PATENT DOCUMENTS

| | | | | |
|---|---|---|---|---|
| 5,088,794 A | * | 2/1992 | Iwami | B60R 22/20 297/475 |
| 5,318,341 A | * | 6/1994 | Griswold | B60N 2/233 297/216.13 |
| 5,441,332 A | * | 8/1995 | Verellen | B60R 22/20 297/473 |
| 5,658,048 A | * | 8/1997 | Nemoto | B60N 2/4808 297/410 |
| 5,722,732 A | * | 3/1998 | Haldenwanger | B60N 2/4876 297/391 |
| 5,733,013 A | * | 3/1998 | Brown | B60R 22/26 280/808 |

(Continued)

FOREIGN PATENT DOCUMENTS

| | | |
|---|---|---|
| CN | 201423946 | 3/2010 |
| CN | 203211148 | 9/2013 |

(Continued)

OTHER PUBLICATIONS

Chinese Office Action for counterpart CN App. No. 201610355961.3 dated Dec. 20, 2017, along with English-language translation thereof.

(Continued)

*Primary Examiner* — Timothy J Brindley
(74) *Attorney, Agent, or Firm* — Greenblum & Bernstein, P.L.C.

(57) ABSTRACT

A vehicle seat includes: a seat back; a rear frame provided in the seat back and configured to have a substantially rectangular shape; and a retractor provided in the seat back and configured to retract a seat belt, wherein the rear frame includes a first side member and a second side member extending in a vertical direction, a connecting member extending in a widthwise direction, and a bracket for mounting the retractor, and wherein the connecting member and one of the first side member and the second side member are coupled together with the bracket at a corner portion of the rear frame.

6 Claims, 5 Drawing Sheets

(56) References Cited

U.S. PATENT DOCUMENTS

| | | | | |
|---|---|---|---|---|
| 5,829,831 A * | 11/1998 | Sharman | B60N 2/36 | 297/378.12 |
| 5,984,419 A * | 11/1999 | Partington | B60N 2/0232 | 297/216.13 |
| 5,988,759 A * | 11/1999 | Bauer | B60N 2/688 | 297/410 |
| 6,264,280 B1 * | 7/2001 | Ohlund | B60R 22/1951 | 297/216.13 |
| 8,038,115 B2 * | 10/2011 | Boes | B60N 2/0705 | 248/430 |
| 9,004,606 B2 * | 4/2015 | Bostrom | B60N 2/688 | 297/464 |
| 2008/0073967 A1 * | 3/2008 | Whalen | B60R 22/34 | 297/468 |
| 2009/0091162 A1 * | 4/2009 | Zimmerman | B60N 2/42709 | 297/216.13 |
| 2010/0187887 A1 | 7/2010 | Yamada et al. | | |
| 2010/0187893 A1 * | 7/2010 | Yamada | B60N 2/688 | 297/452.18 |
| 2010/0327138 A1 * | 12/2010 | Yamada | B60N 2/0705 | 248/429 |
| 2013/0113255 A1 * | 5/2013 | Glaser | B60N 2/688 | 297/340 |
| 2013/0140868 A1 | 6/2013 | Muck et al. | | |
| 2013/0278042 A1 * | 10/2013 | Wenz | B60N 2/58 | 297/463.1 |
| 2014/0232162 A1 * | 8/2014 | Mitsuhashi | B60N 2/688 | 297/452.18 |
| 2014/0306506 A1 * | 10/2014 | Ruspa | B60N 2/686 | 297/452.19 |
| 2015/0097410 A1 * | 4/2015 | Carbone | B60N 2/688 | 297/486 |
| 2015/0336493 A1 * | 11/2015 | Watanabe | B60N 2/688 | 297/354.12 |
| 2016/0347223 A1 * | 12/2016 | Akaike | B60N 2/682 | |

FOREIGN PATENT DOCUMENTS

| | | |
|---|---|---|
| CN | 204077450 | 1/2015 |
| JP | 2002-283892 | 10/2002 |
| JP | 2005-103002 | 4/2005 |
| JP | 2006-247066 | 9/2006 |
| JP | 2006-273098 | 10/2006 |
| JP | 2009-126200 | 6/2009 |
| JP | 2010-143438 | 7/2010 |

OTHER PUBLICATIONS

Office Action issued in Japan Counterpart Patent Appl. No. 2015-106633, dated Oct. 9, 2018, along with an English translation thereof.

* cited by examiner

VEHICLE SEAT

CROSS-REFERENCE TO RELATED APPLICATION

This application claims priorities from Japanese Patent Application No. 2015-106633 filed on May 26, 2015, the entire subject matters of which is incorporated herein by reference.

TECHNICAL FIELD

The present disclosure relates to a vehicle seat.

BACKGROUND

There is a vehicle seat of a type having a retractor of a seat belt internally mounted in a seat back. In this type of vehicle seat, the retractor is mounted to a rear frame, which serves as a frame of the seat back, by a mounting bracket. In a configuration disclosed in JP-A-2002-283892, in order to ensure the rigidity of the rear frame, the rear frame is configured to have a rectangular frame body and is provided with the mounting bracket for mounting the retractor on a lower corner part of the frame body.

In the configuration disclosed in JP-A-2002-283892, after shaping the rear frame into a rectangular frame shape, the bracket is mounted on the rear frame. That is to say, the strength and rigidity of the vehicle seat as a frame is ensured solely by the rear frame, and the bracket is in place only for mounting the retractor on the rear frame. Thus, the structure of the rear frame is the same as that of the vehicle seat of a type without a retractor, and as the mounting of the bracket does not help to omit any part of the vehicle seat, the vehicle seat may become heavier in weight.

SUMMARY

The present disclosure is made in consideration of the above-mentioned circumstances, and one of objects of the present disclosure is to provide a vehicle seat having a retractor of a seat belt internally mounted inside a seat back, which has a configuration that enables to avoid adding excess weights to the seat.

According to an illustrative embodiment of the present disclosure, there is provided a vehicle seat including: a seat back; a rear frame provided in the seat back and configured to have a substantially rectangular shape; and a retractor provided in the seat back and configured to retract a seat belt, wherein the rear frame includes a first side member and a second side member extending in a vertical direction, a connecting member extending in a widthwise direction, and a bracket for mounting the retractor, and wherein the connecting member and one of the first side member and the second side member are coupled together with the bracket at a corner portion of the rear frame.

DETAILED DESCRIPTION

Hereinafter, an illustrative embodiment of the present disclosure will be described with reference to the accompanying drawings.

FIGS. 1 to 5 show an embodiment according to the present disclosure. The embodiment is an example of a seat back of a vehicle seat to which the present invention is applied. In each figure, the arrows indicate every direction in a vehicle to which the vehicle seat is installed. In the following description, directions and orientations are described with reference to these directions.

Figure 1:
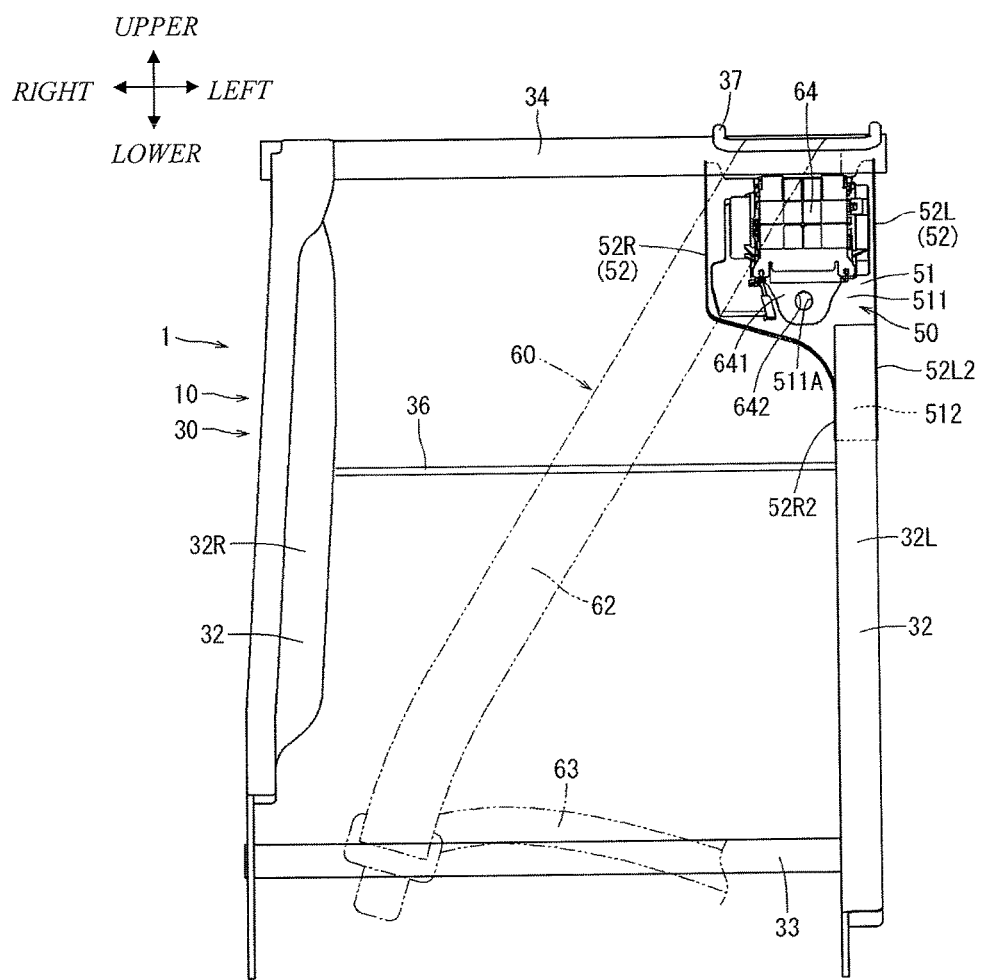
FIG. 1 is a front view of a rear frame of a vehicle seat according to an embodiment of the present disclosure.

As illustrated in FIG. 1, a seat back 10 of a vehicle seat 1 includes a metal rear frame 30 as a frame member. The seat back 10 has a configuration in which: a back pad (not shown) is placed as a seat cushion member on the rear frame 30, and the back pad is covered with a back cover (not shown). As shown in FIG. 1, the rear frame 30 mainly includes two left and right side frames 32, a lower pipe 33, an upper pipe 34, and a bracket 50.

Figure 2:
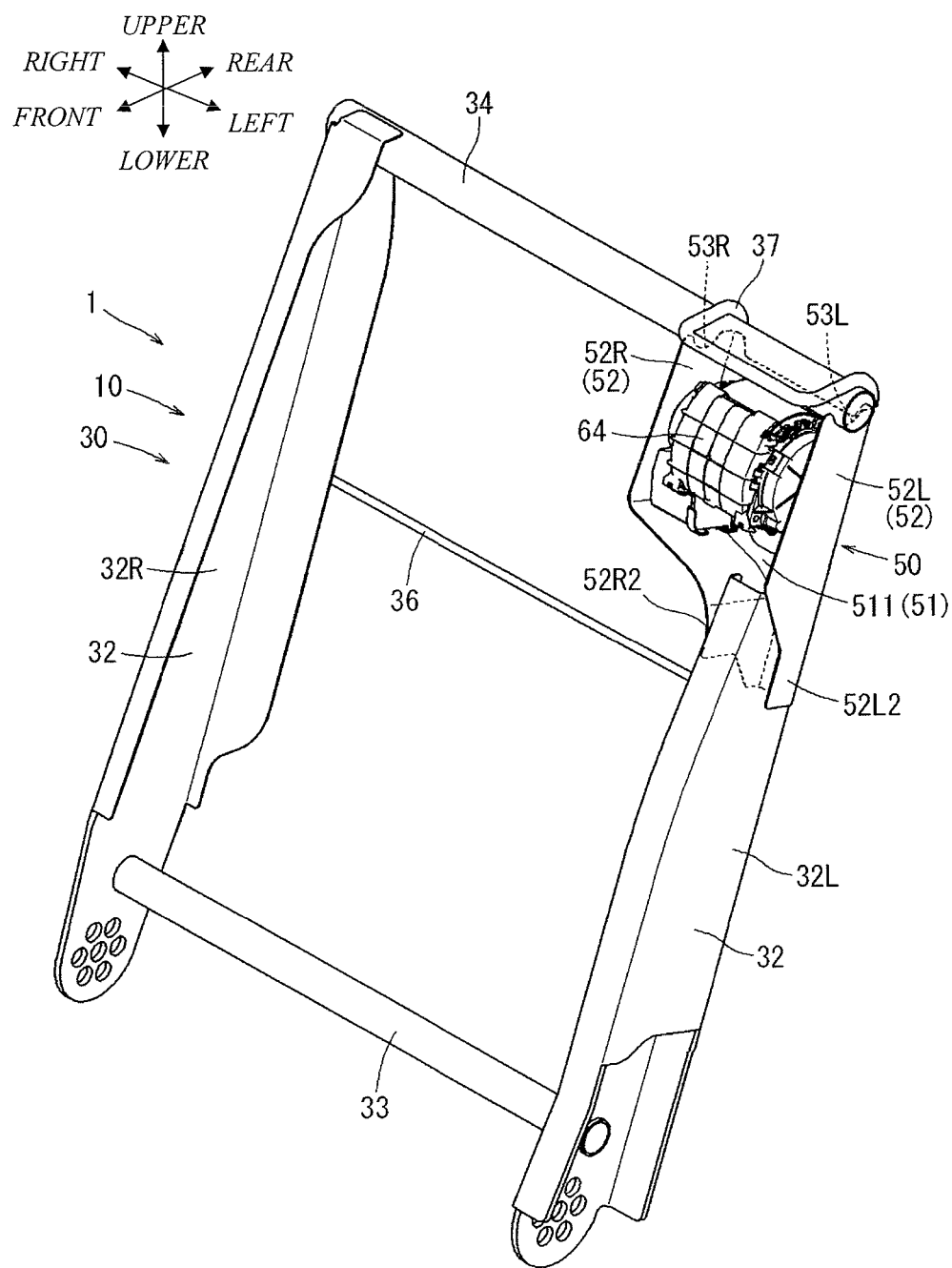
FIG. 2 is a perspective view of the rear frame according to the embodiment viewed from front upper left direction.
Figure 3:
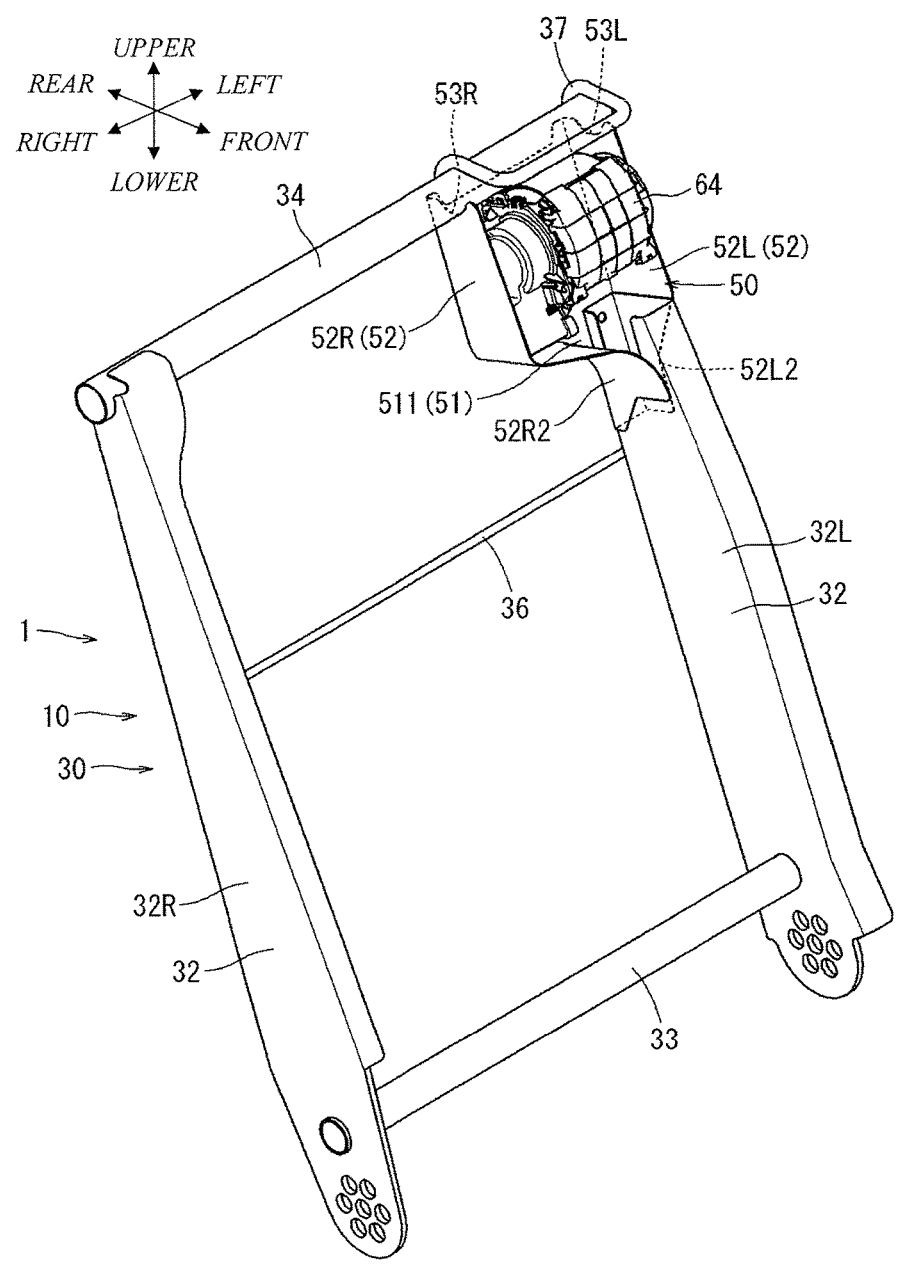
FIG. 3 is a perspective view of the rear frame according to the embodiment viewed from front upper right direction.

As shown in FIGS. 2 and 3, the side frames 32 are made of high tensile steel, and include a left side frame 32L and a right side frame 32R. The left side frame 32L is a square tube member extending vertically. The right frame 32R is a planar member extending vertically with a substantially U-shaped cross section in a plane parallel to a floor of the vehicle, which opens to the left. The left side frame 32L is higher in rigidity than the right side frame 32R. This helps to withstand a bending load applied during a vehicle collision through a retractor 64 mounted on the left side frame 32L.

As shown in FIGS. 2 and 3, a lower end of the left side frame 32L and a lower end of the right side frame 32R are coupled via a recliner (not shown) with a rear end of a cushion frame (not shown) that serves as the frame member of a seat cushion (not shown). Thus, it is possible to adjust an inclination angle of the seat back 10 with respect to the seat cushion. As shown in FIG. 1, a length of the left side frame 32L in vertical direction is set to be around 80% of a length of the right side frame 32R in the vertical direction. The left side frame 32L and the right side frame 32R respectively correspond to the "first side member" and the "second side member" in the present disclosure.

As shown in FIGS. 2 and 3, the lower pipe 33 is a cylindrical tube member made of high tensile steel and extending in a widthwise direction. The lower pipe 33 couples a lower side of the left side frame 32L with a lower side of the right side frame 32R to extend between the left side frame 32L and the right side frame 32R. In more detail, a left end of the lower pipe 33 is fixed to the lower side of the left side frame 32L by welding in a state where the left end of the lower pipe 33 is penetrating through the lower side of the left side frame 32L in the widthwise direction. A right end of the lower pipe 33 is fixed to the lower side of the right side frame 32R by welding in a state where the right end is penetrating through the lower side of the right side frame 32R in the widthwise direction.

Figure 4:
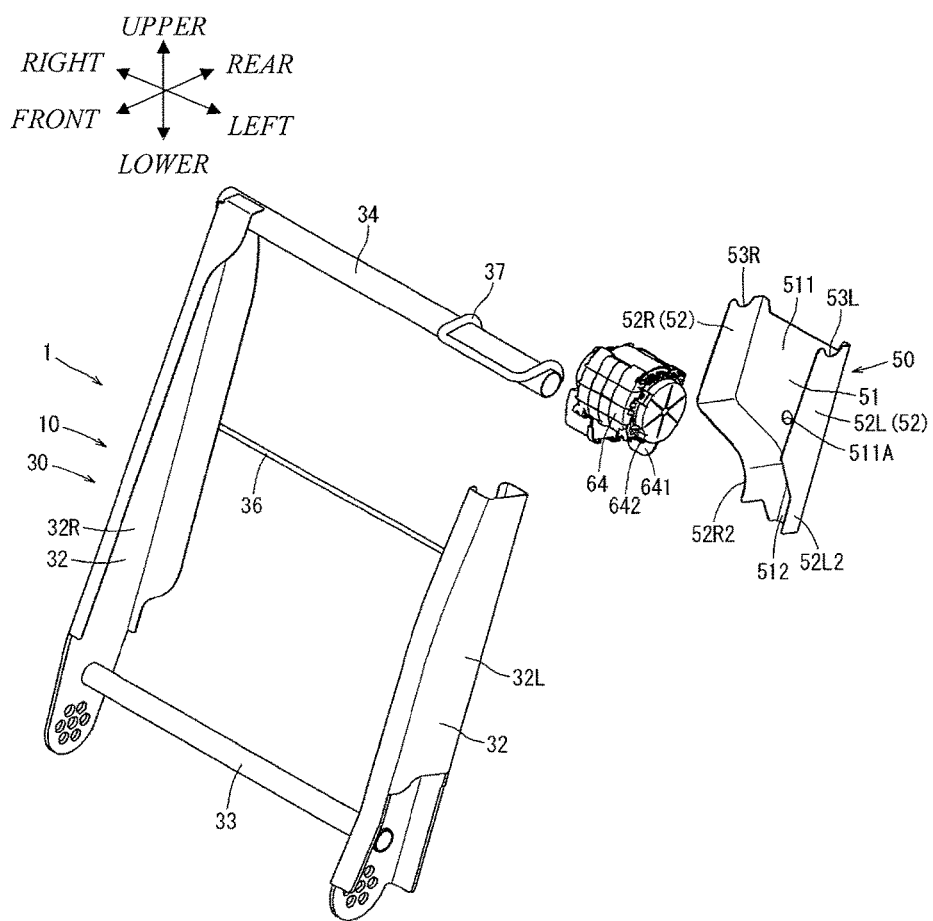
FIG. 4 is an exploded perspective view showing a state where a retractor and a bracket are removed from the rear frame according to the embodiment.

As shown in FIGS. 2 and 3, the upper pipe 34 is a cylindrical tube member made of high tensile steel and extending in the widthwise direction. The upper pipe 34 couples the bracket 50 mounted on an upper end of the left side frame 32L with an upper end of the right side frame 32R. In more detail, a left side of the upper pipe 34 is fixed to the bracket 50 by welding in a state where the left side of the upper pipe 34 is placed on recesses 53L and 53R of the bracket 50. A right side of the upper pipe 34 is fixed to the right side frame 32R by welding in a state where the right side of the upper pipe 34 is placed on the upper end of the right side frame 32R. A through wire 37 is attached to an upper part of the left side of the upper pipe 34 by welding. As shown in FIG. 1, the through wire 37 is formed in a substantially U shape which opens to the rear side and is a part for a shoulder belt 62 of a seat belt 60 to pass therethrough. In FIGS. 2 to 4, structures of the seat belt 60 are omitted except the retractor 64. The lower pipe 33 and upper pipe 34 correspond to "connecting members" of the present disclosure.

Figure 5:
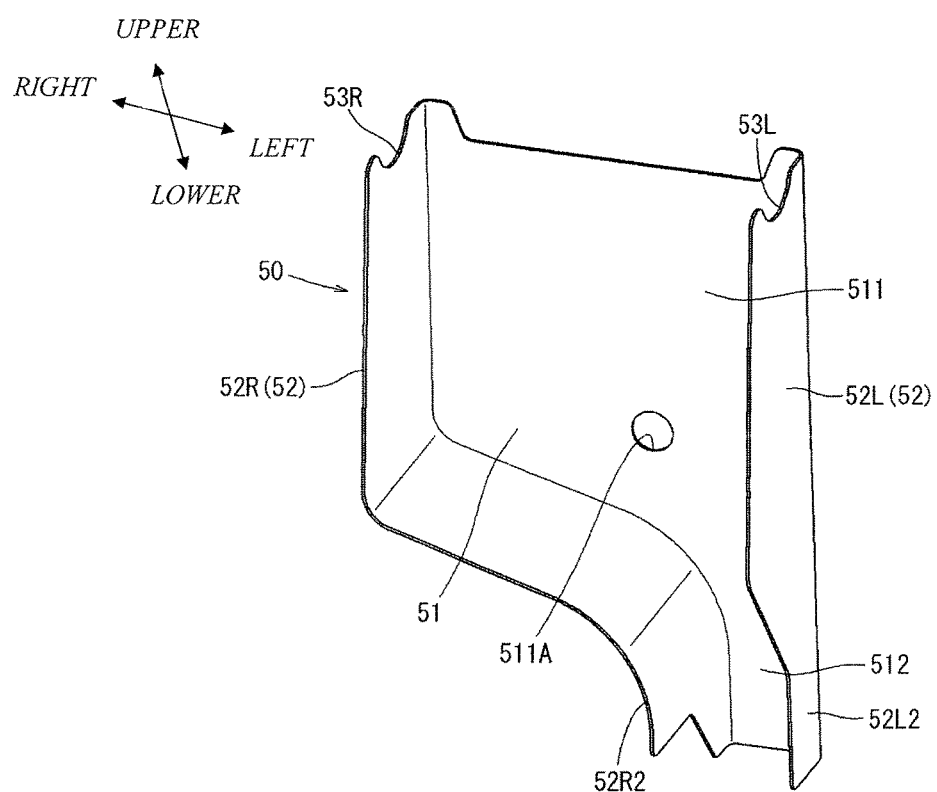
FIG. 5 is a perspective view of the bracket according to the embodiment.

As shown in FIG. 5, the bracket 50 is a planar member made of high tensile steel. The bracket 50 has a base 51 having a shape of substantially rectangular shape, a part of which is partially being cut off, and upright walls 52 that rise upward with respect to the base 51 from right and left side edges of the base 51. In detail, the base 51 is formed by cutting, in a substantially quarter circle shape, a lower left corner of a plane having rectangular shape that extends in the vertical direction. A wide part 511, which is longer in widthwise direction, is formed on upper end side of the base 51. A narrow part 512, which is shorter in the widthwise direction, is formed on lower end side of the base 51. A length of the narrow part 512 in the widthwise direction is roughly one-fourth of a length of the wide part 511 in the widthwise direction and slightly longer than a length of the left side frame 32L in the widthwise direction. A length of the wide part 511 in the widthwise direction is longer than a length of the retractor 64 in the widthwise direction.

As shown in FIG. 5, a hole 511A is formed on the wide part 511, through which a bolt for mounting the retractor 64 is inserted. The recesses 53L and 53R, which are recessed toward the narrow part 512, are formed on an upper end of a linear upright wall 52L and an upper end of a curved upright wall 52R. The recesses 53L and 53R are configured to support the upper pipe 34 from below. The recesses 53L and 53R correspond to "connecting part" of the present disclosure.

As shown in FIG. 1, a support wire 36, which extends in the widthwise direction, is arranged between the left side frame 32L and the right side frame 32R at a position slightly above the middle parts of the left side frame 32L and the right side frame 32R in the vertical direction. The support wire 36 is a support member that supports the back pad from backside by abutting a rear surface of the back pad.

As shown in FIG. 1, the seat belt 60 is a so-called three-point seat belt assembly, and mainly includes the shoulder belt 62, a lap belt 63, and the retractor 64. The shoulder belt 62 is a belt member that is extended at a front of an occupant's body from a left shoulder part to a right waist part of the occupant. An upper end of the shoulder belt 62 is wound around a reel part (no shown) of the retractor 64 after being passed through the through wire 37 from above toward below. The lap belt 63 is a belt member that is extended at the front of the occupant's body from the right waist part to a left wait part of the occupant. A right part of the lap belt 63 is continuous with a lower end of the shoulder belt 62, and a left end part of the lap belt 63 is fixed to a body of the vehicle. The retractor 64 is normally in a state where the shoulder belt 62 can be drawn out freely. When the vehicle is in a head-on collision, the retractor 64 becomes in a state where the shoulder belt 62 is prohibited from being drawn out for retaining the occupant's body from being moved forward due to inertia force. A flange 641 is formed in a lower part of the retractor 64, which abuts the wide part 511 of the base 51 on the bracket 50. The flange 641 is formed with a mounting hole 642, through which a bolt is inserted.

Referring to FIG. 4, a method for connecting the bracket 50 to the left side frame 32L and the upper pipe 34 is described. The narrow part 512 of the base 51 on the bracket 50 is abutted against a rear surface of the left side frame 32L from behind. At this time, an end portion 52L2 of the linear upright wall 52L and an end portion 53L2 of the curved upright wall 53L of the bracket 50 respectively abut against a left surface and a right surface of the left side frame 32L. In this state, while positioning the recesses 53L and 53R of the bracket 50 to abut the upper pipe 34 from below, the narrow part 512, the end portion 52L2 of the linear upright wall 52L, and the end portion 53L2 of the curved upright wall 53L are welded with the left side frame 32L, whereby the bracket 50 is attached to the left side frame 32L. Next, the bracket 50 is attached to the upper pipe 34 by welding the recesses 53L and 52R of the bracket 50 to the upper pipe 34. Thereafter, the retractor 64 is abutted against the wide part 511 of the base 51 of the bracket 50 from the front, and the bolt is inserted into the mounting hole 642 and the hole 511A and fastened after the mounting hole 642 of the retractor 64 is aligned with the hole 511A of the bracket 50.

The embodiment configured as described above has the following advantages. The bracket 50 for mounting the retractor 64 serves as a part of the frame body of the rear frame 30, which has a rectangular shape. Thus, a part of the left side frame 32L may be omitted for the part the bracket 50 is serving as the frame body. Therefore, it is possible to prevent more materials from being used for manufacturing the rear frame 30, and the weight of the vehicle seat is prevented from being increased. A side part of the backrest of the vehicle seat is formed to be thicker than a main part, and the retractor 64 is mounted to the bracket 50 while the bracket 50 is attached to the side part of the backrest. Thus, it is possible to make the back pad covering the retractor 64 to be thinner thereby reducing discomfort of the occupant when seated. During a head-on collision of vehicles, a larger torque is applied to the lower side of the left side frame 32L while a relatively smaller torque is applied to the upper side of the left side frame 32L. Since the bracket 50 is mounted on the upper side of the left side frame 32L, it is possible for the bracket 50 to have a relatively simple configuration and effectively prevent the weight of the vehicle seat from increasing. The connecting parts of the bracket 50 with respect to the upper pipe 34 are mounted on the recess 53L, which is positioned at a position directly above a position at which extension line of the left side frame 32L intersects, and on the recess 53R, which is positioned more toward right from the position directly above the position at which the extension line of the left side frame 32L intersects. According to this configuration, the bracket 50 serves as a brace between the left side frame 32L and the upper pipe 34, thereby improving the rigidity of the rear frame 30 in the widthwise direction.

The above specific embodiment has been described, but the present disclosure is not limited to the appearance and structure of the embodiment and various modifications, additions or deletions may be available without departing the scope of the present invention.

For example, in the embodiment, the upper end of the left side frame 32L and the left side of the upper pipe 34 are configured to be in non-direct connection, and by connecting the parts in non-direct connection with the bracket 50, the bracket 50 and the retractor 64 are arranged on the upper left side of the seat back 10. However, the present invention is not limited to such configuration, and, for example, the lower end of the left side frame 32L and the left side of the lower pipe 33 may be configured to be in non-direct connection, and by connecting the parts in non-direct connection with a bracket, the bracket and the retractor 64 may be arranged on the lower left side of the seat back 10.

In the embodiment, the recesses 53L and 53R are provided respectively on the upper end of the linear upright wall 52L and the upper end of the curved upright wall 52R of the bracket 50, and the upper pipe 34 is placed and welded on the recesses 53L and 53R. According to this configuration, connection of the bracket 50 with respect to the upper pipe 34 is made at two points, i.e. at the recesses 53L and 53R. However, the present disclosure is not limited to such configuration. For example, connection of the bracket 50 with respect to the upper pipe 34 may be made as a linear line by welding the upper end of the base 51 on the bracket 50 to the upper pipe 34. In this configuration, it is possible for the bracket 50 to serve as a brace by welding the upper end of the base 51 on the bracket 50 to the upper pipe 34 from a position directly above a position at which the extension line of the left side frame 32L intersects to the part more toward the right from the position directly above the position at which the extension line of the left side frame 32L intersects.

The embodiment is described for a vehicle seat 1 which is configured as a seat for a single occupant. However, the present invention is not limited thereto, and may also be applied to a seat for two occupants or three occupants on which multiple occupants may sit side by side in widthwise direction.

The embodiment is described for a case where the present invention is applied to a vehicle seat installed in a passenger car, however, the present invention may also be applied to seats installed on aircrafts, ships, and trains.

What is claimed is:

1. A vehicle seat comprising:
   a seat back;
   a rear frame provided in the seat back and configured to have a substantially rectangular shape; and
   a retractor provided in an upper portion of the seat back that is configured to retract a seat belt, wherein
   the rear frame includes a first side member and a second side member extending in a vertical direction, a connecting member extending in a widthwise direction, and a bracket that mounts the retractor at the upper portion of the seat back,
   the connecting member and one of the first side member and the second side member are coupled together with the bracket at an upper corner portion of the rear frame,
   the bracket is coupled with the connecting member at a first position at which the connecting member intersects with a virtual line extending from the first side member and at a second position that is shifted from the first position toward a side where the second side member is arranged, and
   the bracket is arranged at a position lower than the connecting member, wherein
      the first position and the second position are arranged at an upper end of the bracket
      the bracket includes a first recess at the first position and a second recess at the second position, and
      the connecting member is mounted on the first recess and the second recess of the bracket.

2. The vehicle seat according to claim 1, wherein
   a length of the first side member in the vertical direction is shorter than a length of the second side member in the vertical direction,
   a lower end of the first side member and a lower end of the second side member are arranged at substantially the same height, and
   an upper end of the first side member and the connecting member are coupled together with the bracket.

3. The vehicle seat according to claim 1, wherein the connecting member includes a first connecting member and a second connecting member, each of which extend in the widthwise direction.

4. The vehicle seat according to claim 3, wherein
   the first connecting member is provided at an upper side in the rear frame, and the second connecting member is provided at a lower side in the rear frame, and
   a length of the first connecting member in the widthwise direction is substantially the same with a length of the second connecting member in the widthwise direction.

5. The vehicle seat according to claim 4, wherein
   a length of the first side member in the vertical direction is shorter than a length of the second side member in the vertical direction,
   a lower end of the first side member and a lower end of the second side member are arranged at substantially the same height, and
   an upper end of the first side member and the first connecting member are coupled together with the bracket.

6. The vehicle seat according to claim 1, wherein the retractor is provided within the rear frame and the retractor is arranged at a position lower than the connecting member.

* * * * *